United States Patent [19]
Zaleski

[11] 3,785,872
[45] Jan. 15, 1974

[54] COMBINATION RESERVE CELL AND HOUSING

[75] Inventor: John Zaleski, Pleasantville, N.Y.

[73] Assignee: P. R. Mallory & Co., Inc., Indianapolis, Ind.

[22] Filed: May 8, 1972

[21] Appl. No.: 253,671

[52] U.S. Cl. .................................. 136/114, 136/90
[51] Int. Cl. ......................................... H01m 21/10
[58] Field of Search .................. 136/114, 112–113, 136/90, 162, 166

[56] References Cited
UNITED STATES PATENTS 3,294,589  12/1966  Barrett ............................... 136/90
3,484,297  12/1969  Zaleski ............................... 136/114

*Primary Examiner*—Anthony Skapars
*Attorney*—Robert Levine

[57] ABSTRACT

A reserve cell designed to be activated by a push-pin, and provided with a sealed enclosure having a guide hole of small dimension to prevent temptation of tampering and activation when openly exposed, and a protective housing for the cell embodying a push-pin element to serve as a tool to activate the cell when deisred, with means serving as a detent to prevent undesired activation by said housing.

8 Claims, 6 Drawing Figures

PATENTED JAN 15 1974 3,785,872

COMBINATION RESERVE CELL AND HOUSING

This invention relates to electric reserve energy cells, and particularly to a combination of a cell and an enclosing housing for storing a cell in activated condition, with the housing constructed to serve as an activating tool immediately available when it is desired to activate the cell.

In U. S. Pat. No. 3,484,297 of the present inventor, issued Dec. 16, 1969, is shown a reserve cell which is inactive until the use of the cell is desired. At that time, the cell is activated to be immediately available for service.

Normally the reserve cell is contained in an hermetically sealed container, which in turn, is enclosed within a suitable outer casing, to provide metallic surfaces of opposite polarity as the polar electrodes of the cell. The activation of such a reserve cell is then normally achieved by the use of an external tool, which may be suitably inserted in an appropriately disposed opening in the outer casing that normally encloses the cell.

In order to avoid any accidental activation of the cell, the opening through which such external tool may be inserted should be made as small as possible to avoid any casual or accidental entry of any force-producing device into such hole. Further, in order to prevent admission of dust and dirt from the outside atmosphere into such opening, even though such dust and dirt might be excluded from the cell proper by the natural design of the cell, it appears desirable to protectively enclose the cell to prevent the entry of dust, dirt or other objects that might, due to impact or due to inertia, cause undesired activation of the cell. Even more important, is to make the size of the hole small enough to prevent tampering.

Thus, because such opening is made small to prevent entry of an undesirable object which might be normally accessible to mere curiosity tamperers, the problem arises of providing a suitable tool to be immediately available to activate the cell, when such need properly arises.

The object of this invention is to provide a solution to both problems, namely to provide a protective closure or housing for the reserve cell, to exclude dirt and other undesirable foreign objects, that might be wielded by tamperers; and second, to provide an activating tool that shall be immediately available when the cell is to be activated, with the tool to be of such construction and design, that the access opening for activating the cell may be made small enough so that usual tools, like screw drivers, will not be admissible to activate the cell.

Another object of the invention is to provide a protective housing that is so constructed as to serve also as an activating tool when activation of the cell is desired, so the cell and its activating device will be complete and be able to be made immediately available when activation of the cell is desired.

In accordance with these objects, the principle of the invention provides an enclosing housing for the cell, embodying a top housing and a bottom closure cap, arranged to enclose the cell, with a sealing tape holding the two parts of the housing normally sealed and held together, while permitting simple removal of the sealing tape to separate and remove the two parts of the housing from the cell, and to permit removal of a loose internal barrier ring normally serving as a spacer between the top housing part and the cell, after which the top housing may be replaced on the cell and coaxially pressed downward on the cell, to force an activating pin within the housing to actuate elements within the reserve cell to activate the cell to make it immediately available for service. With this construction, the activating pin in the housing is made part of, or anchored on the housing, and may be made relatively small in diameter, with the hole correspondingly small, so that the opening into the cell structure will not permit the entry of any usual handtool that is usually available, such as a screw driver, which is normally available anywhere.

By provision of the housing both as a protective enclosure and as an activating device, the cell and the housing constitute a unitary combination which protects the cell against improper activation, and makes it possible for anyone, without the need of special tools, to immediately activate the reserve cell when it is needed. The provision of an access hole to the cell, that is too small for ordinary hand tools, assures protection against tampering, that could ruin the cell and cause it to be unusable when actually needed in emergency.

The combination reserve cell with protective and activating housing, is described in more detail in the following specification taken together with the drawings in which the structure is shown, in which FIG. 1 is a vertical sectional view of the combination cell and protective housing;

Figure 3:
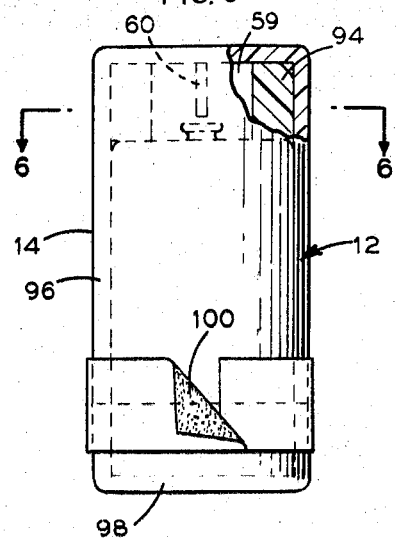
FIG. 3 is a simplified schematic elevation of the housing for the cell in normal protective enclosing condition, with the housing elements held closed, and a removable spacer holding the housing top in non-activating position.
Figure 4:
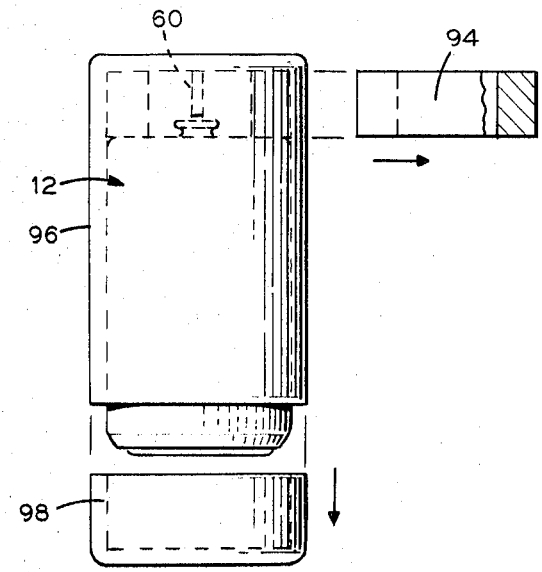
FIG. 4 is a similar schematic front elevational view of the housing, after the tear-tape has been removed and the housing opened to remove the detent cyclinder, with top housing part restored to enable the housing to be propelled against the cell to cause the fracture of the vial of electrolyte.
Figure 6:
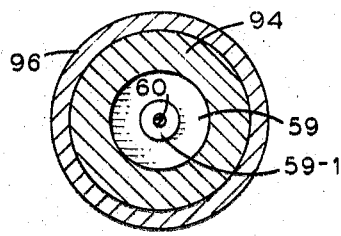
Figure 5:
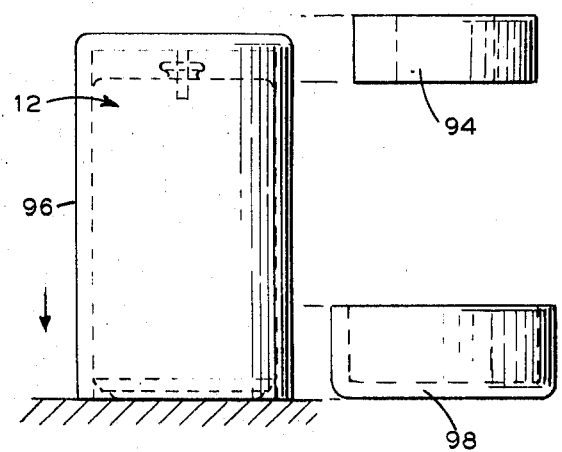

FIG. 5 shows the close-coupled relationship of the housing to the cell, at the end of the actuating stroke of the housing top, to fracture the vial of the electrolyte, with the two normally inhibiting elements of the housing shown alongside the cell and its activating housing; and FIG. 6 is a transverse sectional view taken along the line 6—6 in FIG. 3, to show the cylindrical detent spacer within the top housing part.

Figure 1:
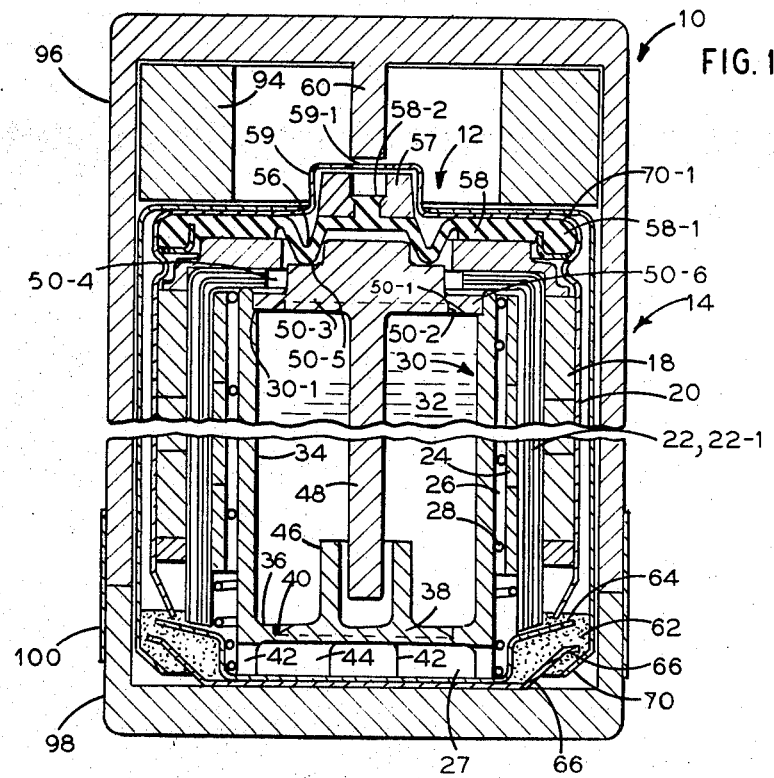
Figure 2:
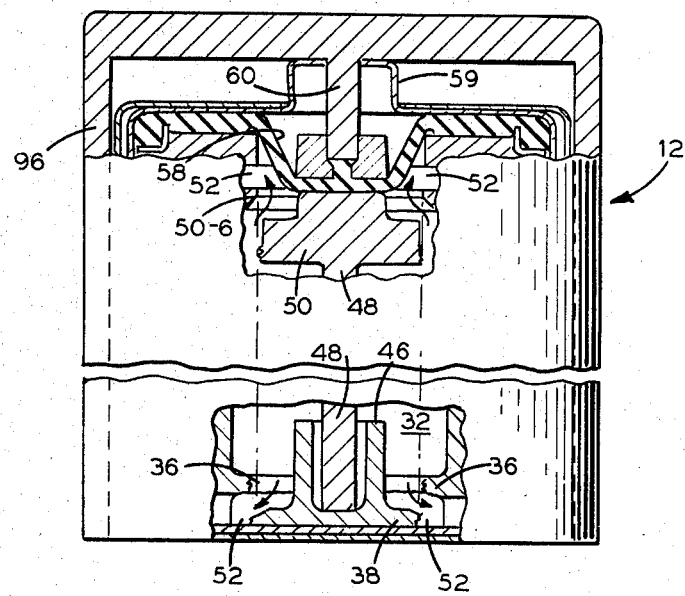
FIG. 2 is a vertical view, partially in elevation and partially in section, to expose the frangible sealing elements of the electrolyte vial, shown broken away to open the vial and release the electrolyte, after activation, by operation of the housing as an activating tool.

As shown in FIG. 1, the invention 10 generally comprises a reserve cell 12 displosed within a protective housing 14 to enclose and protect the reserve cell in non-activated condition until its activation is desired.

The reserve cell is shown as being cylindrical in form in order to provide for symmetry and ease in assembly and manufacture. As shown, the cell is provided with a concentric cylindrical cathode structure 18, consisting of several superposed concentric rings coaxially disposed and confined in a metallic cylindrical can 20, and disposed to engage the inner surface of said can 20, for good electrical conductivity therewith. Radially disposed, within the cathode material 18, is a separator structure 22, of material suitably absorbent to the electrolyte that will be later directed into the space occupied by such separator 22, to provide an ionic conducting medium between the cathode cylindrical structure 18 and a cylindrical anode structure 24, that also consists generally of a set of concentric cylindrical rings of anode material superposed in coaxial arrangement to engage the inner peripheral surface of the separator 22.

In order to provide a relatively free space 26 radially bordering the inner surface of the anode 24, both to permit rapid flow of the electrolyte into the space within the anode cylindrical structure 24, and to define a free central space 27 for a cylindrical vial 30, a spacing metallic helix 28 is disposed to engage the inner surfaces of the superposed cylindrical rings of anode 24. The helical spring 28 serves these functions here:
1. to define an open space for the electrolyte to move quickly into engagement with the anode structure, later, upon activation;
2. to provide a certain amount of physical support to the cylindrical anode ring structure 24;
3. to provide electrical contact to bridge the several cylinders of the anode structure in order to maintain a uni-potential condition along the length of the anode; and
4. to define an inner concentric space for an electrolyte containing-vial to be co-axially inserted.

Within such internal axial space defined by the helical spring conductor 28 is then positioned, in the process of the manufacturting assembly, a plastic vial 30 containing a predetermined volume of electrolyte 32, that is normally contained and isolated within the vial 30 as long as the reserve cell is not desired for active use. When the reserve cell is desired as a source of electric energy, the vial 30, that is normally sealed closed, is broken open by fracturing the two ends of the vial, to release the fluid electrolyte from the vial, so that the electrolyte may then spill over and enter into the operating space around the anode 24 and into the absorbent spacer 22 and into any remaining space between the anode 24 and the cathode material 18.

As shown in FIG. 1, the plastic vial 30 is normally initially formed as an elongated cylindrical cup with an elongated cylindrical body 34 and a bottom or lower end wall 36, which embodies, as part of the end wall, a central concentric knock-out element 38 connected to the end wall 36 by a thin circular juncture 40 provided to have a sharp corner edge that will permit the knock-out element 38 to be broken away by fracturing the junction 40 at the sharp corner. The bottom wall 36 which includes the initially joined knock-out section 38 to constitute the total bottom wall of the vial 34, embodies several spaced feet 42 to support the vial and to provide an under manifold floor space 44 into and through which the electrolyte can flow when released from the vial. A hollow cylindrical boss 46 is formed on the central knock-out portion 38 to serve as a limiting guide for a fracturing push-rod 48 which is arranged to be actuated by an external pressure, or forceful blow, to fracture and separate the knock-out portion 38 at the bottom of the vial 30, while a similar knock-out portion at the top of the vial is being broken away.

The push-rod 48 is formed as a coaxial extension of an upper sealing circular disc 50 that serves as a sealing plug for the vial 30. The sealing plug 50 seats on a shoulder 30-1 at the top rim of the vial 30 and serves as a closing plug for the vial when the vial is filled with the electrolyte. The plug 50 is also of plastic and therefore may be readily sealed to the plastic vial when the plug 50 is pressed into seating position at the upper end of the vial 30.

The plug 50 includes several elements that serve several functions. First, the bottom cylindrical portion of the plug 50 is provided with a knock-out portion defined by a circular notch 50-1 having a sharp corner 50-2 similar to the notch and sharp corner 40 in the floor at the bottom of the vial 30. The plug 50 also embodies a central coaxial hub 50-3 which serves as a limiting element to define a space 52 that will be effective to serve as a temporary transfer space, in passage, for the electrolyte wnen it leaves the vial upon fracture of the central disc 50-3. The diameter of the hub 50-3 also corresponds to the dimension of the central knock-out portion 50-4 in order to permit a clean break at the corner 50-2. The hub 50-3 has a top surface 50-5 that serves as a seat for a downwardly depending corrugation 56 of a corrugated diaphragm 58 that is also provided with an annular anchoring portion 58-1 and a coaxial impact boss 58-2, by means of which an external element, now indicated as an actuating plunger rod 60 on the top housing element, that will serve to depress the impact boss 58-2 of the diaphragm to force the plug 50 downward, to fracture the plug knock-out from its outer supporting ring 50-6, and then to sever the lower knock-out 38, to open the vial at both ends.

The bottom of the cell embodies, briefly, a plastic annular anchor ring 62 as a sealing seat, that retains a double closure including metallic discs 64 and 66, to close the lower end of the cell.

The bottom of an outer metallic can enclosure 70 is peened over the anchor 62, and then, at the top 70-1 is peened over the top annular area 20-1 of the inner can 20, around the cover cap 59 that is part of the can 20.

It is one purpose of this invention to protect against premature and undesired activation, as could occur if the coaxial impact boss 58-2 were accidentally dislodged or forced inwardly against the plug 50. For that purpose, access to the coaxial actuating impact boss 58-2 is prevented by a cover cap 59, having a central coaxial opening 59-1 to admit an impact rod 60 to press and push the diaphragm center to sever the knock-out 50-4 of the plug 50 and then to sever the lower knock-out 38.

In order to achieve maximum protection against undesired activation, and especially against tampering, the hole 59-1 for the plunger rod 60 is made small enough to prevent entry of a screw-driver bit of usual size that would normally be available to a person where the cells would be stored.

The plunger rod 60 may therefore be made of minimum size, just sufficient to enter the hole 59-1 when actuated by the top housing element 96.

To prevent accidental activation of the top housing 96, a loose removable annular ring cyclinder 94 is coaxially supported between the cell and the outer housing. The cylinder 94 may be made of any suitable material such as a plastic ring or a rolled coil of paper, since the use is merely temporary to serve as a restraining element that will be discarded when the cell is to be activated. At that time, the top housing 96 will be separated from its cooperating bottom housing cap 98, on removal of the sealing tear-tape 100 which serves to hold the upper and lower parts of the housing, 96 and 98, together, as a protective closure around the reserve cell.

When the cell is to be activated, the tear-tape 100 is removed, the two elements of the housing are removed from the cell, and the retainer ring 94 is removed and discarded. The upper housing 96 is then forced downward upon the cell to force the actuating rod 60 coaxially downward into opening 59-1 to engage the coaxial boss 58-2 on the diaphragm 58, and, in continuing movement, the rod 60 forces the plug 50 downward to break the hub 50-3 away from its supporting outer ring 50-6, and at the same time forces the connecting rod 48 downward into its guided pocket 46 to fracture the bottom knock-out 38 away from the bottom wall 36. In order to obtain the full leverage of the housing in fracturing the vial top and bottom knock-outs, the cell may be disposed to stand erect on a suitable support and the housing then either pushed downward or struck with a sudden blow. The coaxial boss 58-2 which has been held in elevated position by a detent ring 57 is actuated to fracture the plug. The electrolyte entrained in the vial will thereupon flow freely out into the space 52 surrounding the vial and into the fluted spaces 22-1 in the separator 22, to provide for rapid wetting of that absorption separator by the electrolyte, and thereby, to activate the cell for immediate operative condition, uniformly over the entire length of the cell.

Thus, a simple removable housing is provided to serve normally as a protective enclosure for the reserve cell, while it is standing waiting to be activated, and when such activation is desired, the housing serves as an activating tool that is immediately available. Thus, the invention contemplates a novel combination of reserve cell with a protective enclosing housing to protect the cell from accidental activation; and the invention includes also a provision of a novel type housing for protecting a reserve cell and for serving as a tool for activating the cell when desired, while controlling the size of the opening into the reserve cell that will prevent casual tampering.

The invention is not necessarily limited to the details of the cell, nor necessarily to the details of the housing as shown since they may be variously modified without departing from the spirit and scope of the invention as set forth in the claims.

What is claimed is:

1. A combination reserve cell and housing for protectively storing and covering the cell while awaiting activation, and the housing serving to activate the cell, when desired, said combination comprising:

a reserve cell having a container enclosing a cathode, an anode, a separator in the space therebetween, and a sealed vessel of electrolyte, all within said container;

an axially movable sealing element embodied by said reserve cell, constituting means designed to be operable by an external actuating element for opening said sealed vessel to release said electrolyte, to permit and enable said electrolyte to enter the effective, operating space occupied by the separator between said anode and cathode;

a guide means disposed in line with a selected region of said sealing element that is to be moved by said external actuating element;

means normally serving as a protective and enclosing housing for said reserve cell to hold the cell unactivated and to prevent casual undesired activation of said cell, wherein said housing embodies an element to serve as said external actuating element to move the sealing element to open said sealed vessel, said housing consisting of a deep upper hollow cylindrical cup and a shallow lower hollow cylindrical cup to serve as a closure cap for said upper cup, said upper housing cup carrying the actuating element that moves said sealing element;

and a removable disposable spacer disposed in said upper housing cup, between the cup and the top of said cell, to prevent casual undesired actuation by said actuating element until such actuation is desired and the spacer removed.

2. A combination reserve electric cell, with a housing for protectively storing the cell and for activating the cell, when desired, as in claim 1, said cell and housing comprising a. a cell structure including
   1. a hermetically sealed cylindrical inner container having an axis,
   2. a concentric anode,
   3. a cathode,
   4. an absorbent separator in a space between said anode and said cathode,
   5. a vial co-axially disposed and having top and bottom frangible end walls, and containing a liquid electrolyte.
   6. an upper end closure for said container consisting of a transverse circular diaphragm having a co-axial central element re-entrantly shaped having axial freedom and axially movable by an applied external force, with said element able to cause fracture of said top and bottom frangible end walls of said vial to release the electrolyte from said vial to fill the space containing said absorbent separator between anode and cathode, and to render the cell active;

b. an outer shell substantially surrounding said sealed inner container, and including guide means for guiding an intended external force element to act against said central re-entrant movable element of said diaphragm to cause said axially movable element of said diaphragm to achieve said fracturing action;

c. and means normally serving as part of an external protective housing for said cell, and embodying a force element for rendering said reserve cell active by operation of said housing acting against said axially movable element of said diaphragm.

3. A combination cell and housing, as in claim 1, in which the length of the upper housing cup and the effective operating length of the actuating element are such that when the bottom cup and the removable spacer are removed and the cell rested on a supporting base, the upper housing cup may be pressed downwardly to cause the actuating element on the upper housing cup to move the sealing element.

4. A reserve cell and housing combination, as in claim 1, comprising a reserve cell having axially extending polar electrodes separated by a radial space, and a vial containing an isolated and confined electrolyte therein for ultimate operative disposition in said space between said electrodes, and an enclosure for said cell components with an element of said enclosure constituting a top diaphragm having a predeteremined limited path of axial movement, and fracturable means within said container and subject to fracture by said diaphragm within its path of movement when said diaphragm is impelled by an external force;

and a housing for said cell, said housing consisting of an elongated inverted hollow top cup slidably fitting over the top of said cell, and of a shallow hollow bottom cup slidably fitting over the bottom of said cell, with a binding strip encircling the housing and holding both top cup and bottom cup together, with spacer means for fixedly positioning said cell within said housing against casual relative shifting, so long as said binding strip is in place and activation of said cell is not desired.

5. A combination reserve cell and housing, as in claim 1, comprising said reserve cell as a self-complete unit and embodying a movable element for activating said cell, and a guide means for directing an external force onto said movable element;

a housing enclosing said cell and preventing casual actuation of said movable element, said housing including an actuating element aligned to enter said guide means to impress a force on said movable element;

spacing means for holding said actuating element from said movable element; and said housing being movable, upon removal of said spacing means, to move said actuating element to impress a force on said movable element to activate said cell.

6. A reserve cell and housing combination, as in claim 5, in which said housing consists of an upper hollow cup and a lower hollow cup, both coaxially disposed and both snugly coaxially fitting over said cell and spacing means, with the open ends of the two cups engaging;

a tape tear strip encircling said housing and holding both cup edges engaged and said housing closed, with said meeting plane of said two cup edges being spaced from the end of said cell opposite the activating end of said cell by a distance corresponding to the length of movement required in said movable element of said cell to cause activation of said cell.

7. A reserve cell and housing as in claim 6, in which said upper housing cup embodies a coaxial pusher element for engaging said movable element of said cell for activating said cell;

and said spacing means holds said upper housing cup spaced from said cell body a sufficient distance to hold said pusher element spaced from said movable element of said cell, to prevent any casual blow on the cell housing from moving said pusher element to activate the cell.

8. A reserve cell and housing, as in claim 7, in which said movable element of said cell is covered and protected by a rigid structure including a coaxial guide element for said pusher element, and said pusher element is coaxially mounted within said upper housing and is movable into and through said guide element to engage and actuate said movable element when the upper housing cup is pressed downward on said cell.

* * * * *